United States Patent [19]

Chen et al.

[11] Patent Number: 5,652,625
[45] Date of Patent: Jul. 29, 1997

[54] MULTI-STAGE PIPELINE ARCHITECTURE FOR MOTION ESTIMATION BLOCK MATCHING

[75] Inventors: Hongyi Chen; Qingming Shu, both of Beijing, China

[73] Assignee: United Microelectronics Corp., Hsinchu, Taiwan

[21] Appl. No.: 666,987

[22] Filed: Jun. 19, 1996

[51] Int. Cl.$^6$ ............................................. H04N 7/32
[52] U.S. Cl. .................................. 348/416; 348/699
[58] Field of Search ........................... 348/416, 402, 348/699, 700, 701, 415, 409, 401, 400, 390, 384; 382/238, 236, 232; 364/715.02; H04N 7/137

[56] References Cited

U.S. PATENT DOCUMENTS

| | | | |
|---|---|---|---|
| 5,030,953 | 7/1991 | Chiang | 348/422 |
| 5,512,962 | 4/1996 | Homma | 348/699 |

Primary Examiner—Tommy P. Chin
Assistant Examiner—Bryan S. Tung
Attorney, Agent, or Firm—Rabin, Champagne & Lynt, P.C.

[57] ABSTRACT

An apparatus for implementing motion estimation block matching for video image processing. The apparatus receives pixel data of original and compared image blocks for comparison, to obtain an image motion vector. The apparatus has a multi-stage pipelined tree-architecture that includes a computation stage, a summation section, an accumulation stage, and a minimum value evaluation stage. The computation stage includes $2^n$ computation members for producing a difference error value and a sign bit of the compared image blocks. The summation section coupled at the pipelined stage next to the computation stage, includes a series of summation stages for producing an absolute error value of the compared image blocks. A following accumulation stage adds an output of the single adder means of the last summation stage and a last un-added sign bit, for producing a sum. A last minimum value evaluator evaluates and generates the minimum of the output of the accumulation stage, as the motion vector for the implementation of motion estimation block matching for video image processing. Only a single adder is required in each of the computation members to reduce both the complexity and the processing delay for increased performance.

5 Claims, 5 Drawing Sheets

MULTI-STAGE PIPELINE ARCHITECTURE FOR MOTION ESTIMATION BLOCK MATCHING

BACKGROUND OF THE INVENTION

1. Field of the Invention

The invention relates in general to a motion estimation apparatus for video image processing. In particular, the invention relates to an apparatus for implementing a block matching scheme for the motion estimation algorithm for video image processing.

2. Technical Background

In the application of video image processing technologies in areas such as high definition television (HDTV), video telephones and video conferencing, the use of video signal compression techniques is one of the key factors when system performance and efficiency are considered. A high compression ratio for a video signal can be translated directly into good performance and high signal processing efficiency of the system. In order to obtain a high compression ratio for video signals, so that digital video data can be processed in the system at lower bit rates, an efficient encoding system and efficient hardware must be used. Typically, an efficient encoding scheme implemented by an encoding system would combine several techniques including, for example, motion compensation, digital cosine transform, visual characteristics quantization, Huffman coding, etc.

Motion compensation for video signal processing is a technique by which the video image signals are manipulated in the time domain, based on the statistical characteristics of video signals. In principle, if consecutive video image frames at very short time intervals have their image blocks analyzed, it is frequently found that each of the analyzed image blocks will normally have a relatively small difference in its video characteristics. This characteristics of the video image, which is the primary difference when still image characteristics are compared, defines the underlying principle for many of the video image compression schemes. The motion compensation technique used thus has an important and significant influence over the compression ratio factor for video image compression and encoding systems.

Motion estimation is the basis for motion compensation techniques. Successful implementation of a motion compensation technique relies on the precision, speed and efficiency of the algorithm that implements the technique. Among the various processes developed for implementing the motion estimation technique, block matching is one that is relatively simple and dear to implement most easily in terms of substantial hardware, and as such has been widely utilized in this area. Of block matching algorithms used for implementing motion estimation in video image processing systems, there are at the present stage several known algorithms, which include full search algorithm, three-step search algorithm, cross-search algorithm, orthogonal search algorithm, etc.

Fast block matching algorithms, as represented by the three-step search algorithm, employ multiple procedural steps to achieve block image matching. Not all possible image blocks are compared, and therefore computational operations are reduced in number. However, any two consecutive procedural steps must still be performed in sequence, which reduces the possibility of parallel implementation, and therefore, hardware logic, employed for implementing such fast block matching algorithms, are required to support extremely high throughput, along with the other requirements of low latency and programmability, and computation logic employing tree architecture becomes the ideal solution for implementing these algorithms.

However, conventional computation logic configurations featuring a tree architecture still require a larger number of processing elements, and time delays in stages of the pipeline are significant enough to limit the clock frequency for processing elements. To examine the reason, a conventional, four-channel tree architecture is taken as an example and briefly described below with reference to the accompanying drawings.

Block matching algorithms make use of the mean values of the absolute error function as the basis for measuring the degree to which matching is achieved. The image block featuring the minimum mean absolute error is the one that matches. Mean absolute error represents the average value obtained by summing all the absolute values of the differences between the respective values of corresponding pixels in the compared and the original image blocks, and then dividing by the total number of processed pixels. Thus, the hardware architecture utilized to implement these block matching algorithms must at least be capable of handling arithmetic operations including subtraction, obtaining an absolute value, summation, and determining a minimum value.

Figure 1:
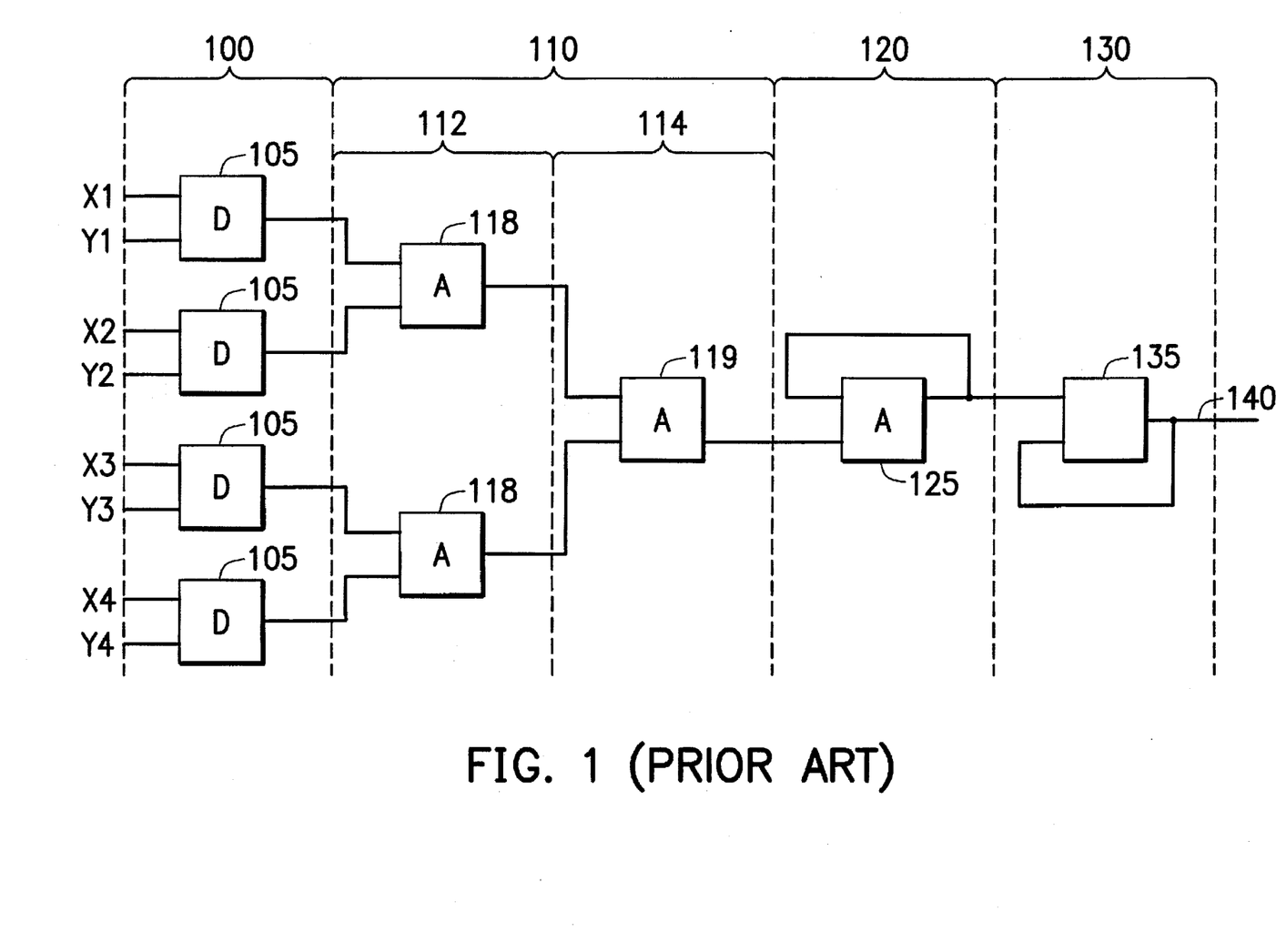
FIG. 1 is a schematic block diagram of conventional four-channel hardware computation logic featuring tree architecture.

For example, FIG. 1 schematically shows the hardware logic block diagram of a conventional four-channel tree architecture, which can be implemented by computer software or circuit arrangement. In the drawing, it is first assumed that both the original and the compared image blocks each have a pixel dimension of four, represented by pixel data X1, X2, X3 and X4 and Y1, Y2, Y3 and Y4. It is further assumed that each of the pixels has n bits of characteristic data. The X and Y pixel data are expressed as $$X=\{x_{n-1}, x_{n-2}, \ldots, x_0\}$$

and $$Y=\{y_{n-1}, y_{n-2}, \ldots, y_0\}$$

respectively, wherein $x_i$ and $y_i$ are pixel data bits for X and Y pixel data, respectively, and are all positive numbers.

The four-channel tree architecture illustrated in the drawing has a total of five computation stages, divided into four portions. Each of the computation stages requires one clock cycle of processing before it can send out its output. As a result, in such a pipelined processing architecture, a total of five clock cycles will be required to conclude one complete computation. As shown in the drawings, the first computation stage is the D computation stage identified by reference numeral 100, which includes four D computation members 105. Each of the D computation members 105 is independent and is responsible for computing the absolute value |X-Y|. With four such D computation members 105, all the four pairs of pixel data in the original and the compared image blocks can be processed to subtract one member of each pair from the other and provide the absolute value of the subtraction.

The two stages in the five-stage processing pipeline next to and downstream from the first D computation stage 100 are formed by a summation section 110 that includes first and the second computation stages 112 and 114. The first computation stage 112 includes two A adders 118, while there is only one A adder 119 in the second computation stage 114. Each of the included A adders 118 and 119 is capable of adding its two inputs. Therefore, the summation section 110 may be used to add together all the absolute values generated by the four respective D computation members 105, as shown in the drawing, where one adder 118 adds the inputs received from two of the D computation members 105, the other adder 118 adds the inputs from the other two, and the adder 119 subsequently adds the outputs of the two adders 118.

The fourth stage in the five-stage processing pipeline, immediately following the summation section 110, is the accumulator stage 120. The accumulator stage 120 includes at least an independent A adder 125, capable of adding the output of the third stage 114 into its current accumulated value. On occasions wherein there are more than four pixels per divided image block that require processing, this basic configuration can be expanded multiply to provide subsequent processing. In other words, the image block to be analyzed can be divided into a number of sub-units each including four pixels and subjected to processing as described. With proper implementation of the procedure, larger image blocks can be processed, but obviously these require an extended time period to complete.

The last of the five computation stages is the minimum evaluation stage 130. As shown in the drawing, this stage includes a minimum value evaluator element 135 that is capable of comparing and identifying the minimum of two values that have been provided thereto. One of the compared values is the value generated by the accumulator stage 120, which is also the summation of the absolute errors of the currently compared image block. The other compared value is the recorded minimum value obtained in the previous comparisons of the summations of the absolute errors for the compared and original image blocks. After all the possible image blocks are compared, the location of the compared image block having the minimum value may be obtained, together with its shift with respect to its corresponding original image block. The shift can be utilized as the motion vector 140, as generated by the last stage 130 of the five-stage pipelined processing architecture of FIG. 1.

Assume Z=X-Y Since both X and Y are positive numbers, Z, comprising n bits, can be expressed as $$Z=\{z_{n-1}, z_{n-2}, \ldots, z_0\}.$$

Then, a scheme for calculating the numerical binary value of |X-Y| can be implemented by the following procedural steps:

a. Obtain the 2's complements for Y. Because Y is the subtrahend only its 2's complement is calculated. To obtain the 2's complement of a binary number, 1 is added to its 1's complement. In other words, all the bits of the number are inverted and then 1 is added to the result, as persons skilled in this art are well aware.

b. Utilize an adder to add the X value to the two 2's complement of the Y value, to obtain Z. And, c. If $z_{n-1}$ (the most significant bit, or MSB, of Z) has a value of 1, this means that Z, obtained by subtracting Y from X, is a negative number, which is an indication of the condition Y>X. In this case, the 2's complement of Z will have to be obtained to obtain the value of |Z|, that is, |X-Y|. on the other hand, when $z_{n-1}$ has a value of 0, then Y<X, so that it is necessary to take an absolute value, since the value of Z=X-Y is already a positive number.

Figure 2:
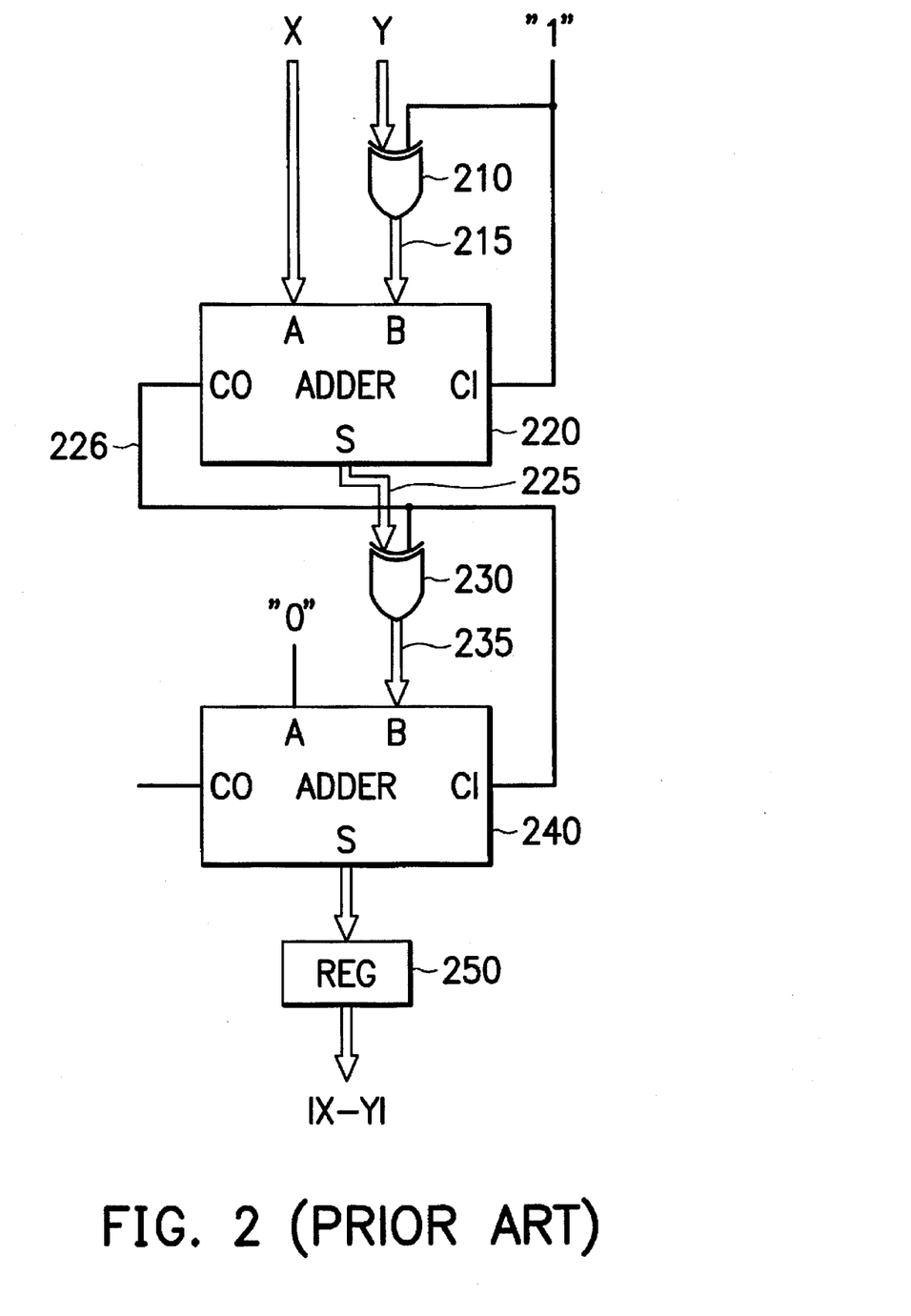
FIG. 2 is a schematic diagram of a D computation member utilized in the conventional computation logic of FIG. 1.

FIG. 2 is a schematic diagram of the D computation member utilized in the conventional computation logic of FIG. 1. As shown in the drawings, the value Y is first applied to one input of a two-input exclusive-OR gate 210, which has its other input tied to the fixed logical value of 1. This is equivalent to obtaining the 1's complement of the value Y at the output 215 of the gate 210. An adder 220 is then utilized to add this 1's complement of Y to the other value X. The carry-in input CI of the adder 220 is also set to the fixed logical value of 1. Thus, 1 is added to the 1's complement of the value Y during addition, resulting in the addition of the value X to the 2's complement of the value Y. As a result, the summation value X-Y is obtained at the output 225 of the adder 220, with the carry-out 226 issued as the sign bit $z_{n-1}$.

Next, the value of X-Y, that is, the output 225 of the adder 220, and the sign bit 226 thereof, can be provided to the second exclusive-OR gate 230. The arrangement is such that the value X-Y is applied to one of the two inputs of the exclusive-OR gate 230, while the sign bit 226, that is, $z_{n-1}$, is applied to the other input thereof. If the sign bit 226 is a logical 1, bits of the value 225 of X-Y are each exclusive-ORed to obtain the 1's complement value thereof. If, on the other hand, the sign bit 226 has a logical value of 0, then bits of the value 225 of X-Y each remain uninverted. The output 235 of the exclusive-OR gate 230 are then provided to a second adder 240, where the sign bit $z_{n-1}$ is added into the total value as the carry-in to obtain |Z|, that is, |X-Y|, which is then stored in a register 250 for the processing needs of the pipelined processing described above. Note, however, that one of the two adder inputs of the adder 240 is tied directly to a fixed logical value of 0. Thus, if the sign bit 226 is a logical 1, indicating a negative result of the first addition, the output of the adder 240 will be the 2's complement of this result, that is, the absolute value of the result. This conventional tree-architecture hardware configuration, due to several factors, has at least the following drawbacks. First of all, the D computation member 105 in the first D computation stage 100 requires latent delay time of two adders arranged in series. This places a restriction on the operating clock rate of the entire system. Secondly, since each D computation stage 100 includes two sets of adders, a total of three times the number of A adders required for each set are required for the entire hardware configuration. Adders, as persons skilled in the art should all be aware, considerably increase the complexity of the hardware.

SUMMARY OF THE INVENTION

It is therefore an object of the invention to provide an apparatus for implementing a motion estimation block matching algorithm for video image processing, having a hardware complexity reduced by less than about one-third as compared to the conventional tree-architecture hardware configuration.

It is another object of the invention to provide an apparatus for implementing a motion estimation block matching algorithm for video image processing, having a processing delay time that is reduced to less than about one-half that of the conventional tree-architecture hardware configuration to increase the allowable operating clock frequencies.

The invention achieves the above-identified objects by providing an apparatus for implementing motion estimation block matching for video image processing. The apparatus receives pixel data of an original image block and pixel data of a compared image block selected from a number of compared image blocks, for comparison to obtain a motion vector thereof. The apparatus has a multi-stage pipelined tree-architecture that includes a computation stage, a summation section, an accumulation stage, and a minimum value evaluation stage. The computation stage includes $2^n$ computation members wherein n is an integer, wherein each of the computation members includes a first exclusive-OR gate for receiving a corresponding one of the pixel data of the compared image block, and which produces the 1's complement thereof; an adder, coupled to the output of the exclusive-OR gate for adding the pixel data of the original image block and a constant logical 1 to the 1's complement of the pixel data of the compared image block, and which produces a difference between the pixel data of the original image block and the compared image block; and a second exclusive-OR gate that has its two inputs coupled, respectively, to a summation output and a carry-out output of the adder. The second exclusive-OR gate produces the 1's complement of the value at the summation output when the value at the carry-out output is a logical one. The summation section coupled at the pipelined stage immediately following the computation stage, comprises at least a first summation stage that includes $2^{n-1}$ adders, wherein each of the adders has one of its two adder inputs coupled to the output of one of the computation members in the computation stage. Also, a carry-in input of the adder is coupled to one sign bit output of one of the adders of the computation stage, so that each adder of the first summation stage produces a sum of the values received on the two adder inputs. The first summation stage further relays all the un-added sign bits of the computation stage to a subsequent stage. A second summation stage comprises $2^{n-2}$ adders, wherein each of the adders has each of its two adder inputs coupled to the output of one of the adders in the first summation stage. The carry-in inputs of these adders are coupled to one sign bit output of either an adder of the computation stage or an adder of the first summation stage, for producing a sum thereof and the values received at the two adder inputs thereof, and outputting the same. The second summation stage further relays all un-added sign bits of the computation stage and the first summation stage of the summation section to a subsequent stage. An n-th summation stage includes a single adder, wherein the single adder has each of its two adder inputs coupled to the outputs of the two adders in the preceding summation stage. The carry-in input of the single adder is coupled to the last sign bit output of the preceding summation stages, for producing a sum of the last sign bit and the values received at the two adder inputs thereof. The n-th summation stage further relays the last an-added sign bit of the preceding stages as an output. The accumulation stage, coupled at the pipelined stage subsequent to the n-th summation stage of the summation section, includes an adder for adding the output of the single adder of the n-th summation stage and the last un-added sign bit to produce a sum for generation therefrom. The minimum value evaluation stage, coupled at the pipelined stage following the accumulation stage, includes a minimum evaluator coupled to the output of the adder of the accumulation stage. The minimum evaluator determines the minimum of the output of the accumulation stage and generates the same as the motion vector, to complete motion estimation block matching for video image processing.

BRIEF DESCRIPTION OF THE DRAWING

Other objects, features, and advantages of the invention will become apparent by way of the following detailed description of the preferred but non-limiting embodiment. The description is made with reference to the accompanying drawings in which.

DETAILED DESCRIPTION OF THE PREFERRED EMBODIMENTS

The preferred embodiment of the block matching apparatus for the motion estimation algorithm of the invention is now described. By block matching for a video image processing algorithm, an entire image frame of a video program has all its image pixels divided into a number of smaller local blocks. For the purpose of the discussion of the invention, it may be assumed that the entire image frame is divided into plural image blocks, each block having an N×N array of $N^2$ pixels formed in N vertical columns and N horizontal rows. Assuming again a maximum possible shift of w pixels for a compared image block with respect to its original counterpart, then an area around the compared image block confined in the range of N+2w should be set up as the search area for seeking the match. A search is performed within this area after a short time interval, seeking to find a number of image blocks, N×N in size for comparison, with their respective distances from the compared original image block represented by (k,l).

An absolute error function F(k,l), which is a function of the distance (k,l) of the compared image block with respect to the corresponding original block, represents the degree of matching between the compared and the original image blocks. A search is made for the minimum value of the function F(k,l) in the pairs of compared and original image blocks of the analyzed video image frame, and the compared image block that provides the minimum value is taken as the matched image block, whose shift with respect to its corresponding original image block is then taken as the motion vector MV for the image frame analyzed.

The degree of the matching error in these algorithms is normally expressed as the mean absolute error, which mathematically, is:

$$F(k,l) = \frac{1}{N^2} \sum_{i=1}^{N} \sum_{j=1}^{N} |X(i,j) - Y(i+k, j+l)|$$

wherein $-w \leq k, l \leq w$,

X is the pixel data in the original image block,

Y is the pixel data in the compared image block, and (k,l) represents the shift of the compared image block with respect to the original.

MV is used to represent the motion vector, and can be expressed as $$MV = (k,l)|_{minF(k,l)}.$$

Based on the above descriptions and expressions, it is clear that the evaluation of the motion vector is perfectly suitable for a tree-architecture hardware configuration to implement in the selected algorithm.

With reference back again to FIGS. 1 and 2, and with proper analysis thereof, it can be seen that the adder 240 of FIG. 2 for the D computation member 105 of FIG. 2 has one of its adder inputs tied to a source of logical 0. Its purpose is simply to add the sign bit $z_{n-1}$, provided as signal 226, in the form of carry-in from the previous adder stage to the other adder input 235. And, as in FIG. 1, the outputs of every two adders 240 in the stage 100 are added together by one adder 118 in the stage 112, while the adders 118 have their carry-in inputs flee from the presence of any sign bits. Thus, it can be decided that the adder 240 in the D computation member 105 utilized in the conventional computation logic of FIG. 1 can be eliminated, and the original adder task it was responsible for performing can be taken up, with proper logic arrangements of course, by the adders 118 in the second stage 112. This reasoning is an underlying concept of the invention for the construction of a neat and efficient apparatus for implementing the motion estimation block matching algorithm for video image processing. Details of the hardware configuration without the presence of those adders 240 in the D computation member 105 are described below.

Figure 3:
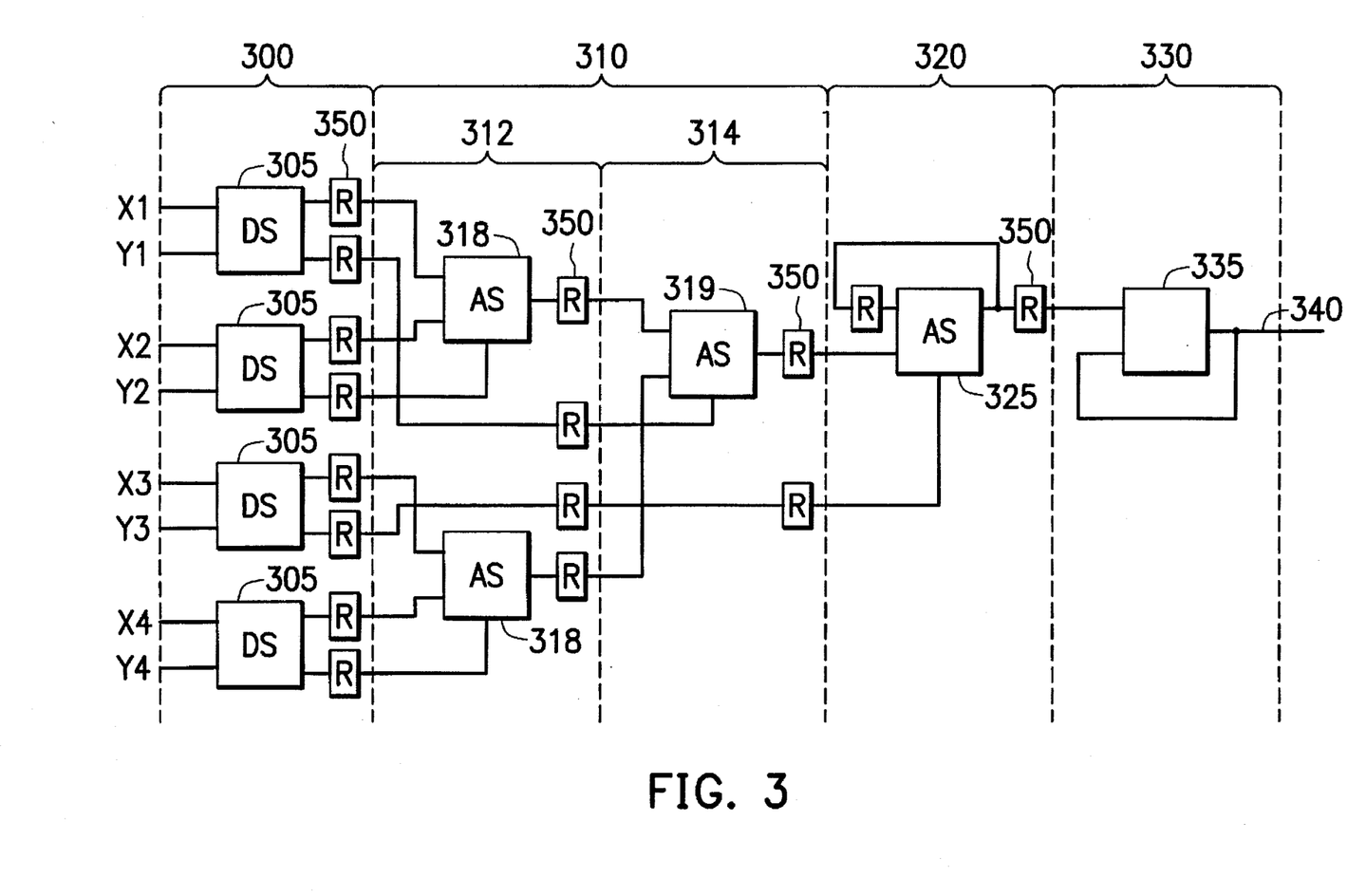
FIG. 3 is a schematic block diagram of four-channel hardware computation logic in accordance with a preferred embodiment of the invention.

Referring to FIG. 3 of the drawing, there is schematically shown a block diagram of four-channel hardware computation logic in accordance with a preferred embodiment of the invention. For the purpose of clarity of the description of the invention, assume again that each of the analyzed image blocks includes a 2×2 image pixel matrix, so that there are a total of four pixels in each image block, with pixel data in the original reference image block represented by X1, X2, X3 and X4, while those in the compared block represented by Y1, Y2, Y3 and Y4, respectively. The use of this elementary pixel configuration for the original and compared image blocks is by no means meant to constrain the scope of the invention. As persons skilled in the art can well appreciate, different pixel matrix dimensions, essentially larger ones, for example, for substantially faster application purposes, are also applicable to the following description.

The four-channel tree-architecture of the invention shown in FIG. 3 can be subdivided into five stages arranged in four sections. Each of the computation stages represents one step that requires a complete system clock cycle to conclude its operations and generate its staged output results. Based on the pipeline operation concept, although it takes five successive clock cycles to obtain the first results in the apparatus of FIG. 3, successive computation results can be streamed out of the pipeline in synchronization with every clock cycle after the appearance of the very first output.

Similar to the assumption made in the above description of the conventional apparatus, it is also assumed with respect to the preferred embodiment, that each of the pixels in both the original and the compared image blocks has n bits of characteristics data. The X and Y pixel data are then expressed as $$X=\{x_{n-1}, x_{n-2}, \ldots, x_0\}$$

and $$Y=\{y_{n-1}, y_{n-2}, \ldots, y_0\}$$

respectively, wherein xi and yi are pixel data bits for X and Y pixel data, respectively, and are all positive numbers. In turn, the Z value can similarly be expressed as $$Z=\{z_{n-1}, z_{n-2}, \ldots, z_0\}.$$

As shown in FIG. 3, the first of the five stages is the DS computation stage 300 includes a total of four DS computation members 305. Each of the DS computation members 305 has two outputs, with one of them carrying the calculated value of |X-Y|, which is the temporary absolute error information, without the sign bit $z_{n-1}$ attached, and the other output is the sign bit $z_{n-1}$ itself. Essentially, the DS computation stage 300 is responsible for producing the absolute value of the error between the compared and the original image blocks, as well as the sign bit data, but dispatches them separately for the next stage to process.

Note, here, that for the purpose of complying with the requirement for smooth pipelined operations, each of the five computation stages is equipped with R buffering registers 350 that assist in synchronizing to the system clock pulses for their respective stages. The registers 350 are responsible for holding the temporary computation results in each stage and for generating to the next successive stage at the appropriate time based on the clock timing.

The two stages that follow the first DS computation stage 300 in the pipeline are the first and second computation stages 312 and 314 that together are designated as the summation section 310. The first computation stage 312 includes two AS adders 318, while in the second computation stage 314 there is only one AS adder 319. Each of the included AS adders 318 and 319 is capable of performing an addition operation on two inputs. Therefore, the summation section 310 may be used to add together all the absolute values generated by the four respective DS computation members 305, as illustrated in the drawing, where one adder 318 adds the inputs received from two of the DS computation members 305 and the other adder 318 adds the inputs from the other two DS computation members, and the adder 319 subsequently adds the outputs of the two adders 318.

During these addition operations, the sign bit of the first of the four DS computation members 305 is taken care of in the addition operation of the AS adder 319 in the second computation stage 314. The sign bit of the second of the four DS computation members 305 is taken care of in the addition operation of the first of the two AS adders 318 in stage 312. The sign bit of the fourth of the four DS computation members 305 is taken care of in the addition operation of the second of the two AS adders 318 of the first computation stage 312 of the summation section 310. Thus, three of the four sign bit data produced during the computation operations of the first computation stage 300 by the four DS computation members 305 are taken care of in the two computation stages of the summation section 310, by the three AS adders 318 and 319. As is described below, the sign bit data generated by the third DS computation member 305 of the first stage 300, is taken care of later in the downstream stages of the pipeline.

The fourth stage in the five-stage processing pipeline, next to the summation section 310, is the accumulator stage 320. The accumulator stage 320 includes an independent AS adder 325, capable of adding the output of the third stage 314 to its current value. Also, the sign bit of the third of the four DS computation members 305 is taken care of in the addition operation of the AS adder 325 in stage 320. Again, on occasions wherein there are more than four pixels per divided image block that require processing, this basic configuration can be expanded in multiple numbers and subsequently processed. An image block to be analyzed can be divided into a number of sub-units each comprising four pixels and subjected to processing as described. With proper implementation of the procedure, larger image blocks can be processed, while requiring extended time periods to conclude.

The last of the five computation stages is the minimum evaluation stage 330. As shown in FIG. 3, it comprises a minimum value evaluator element 335 that is capable of comparing and identifying the minimum of two values provided thereto. One of the compared values is the output sent by the accumulator stage 320, which is also the summation of the absolute errors of the currently compared image block. The other compared value is the minimum value obtained in the previous comparisons of the summation of the absolute errors for the compared and the original image blocks (fed back from the output of the evaluation element 335). After all the possible image blocks are compared, the location of the compared image block having the minimum value may be obtained, together with its shift with respect to its corresponding original image block. These can be utilized as the motion vector 340, as generated by the last stage of the five-stage pipelined processing architecture of FIG. 3.

Figure 4:
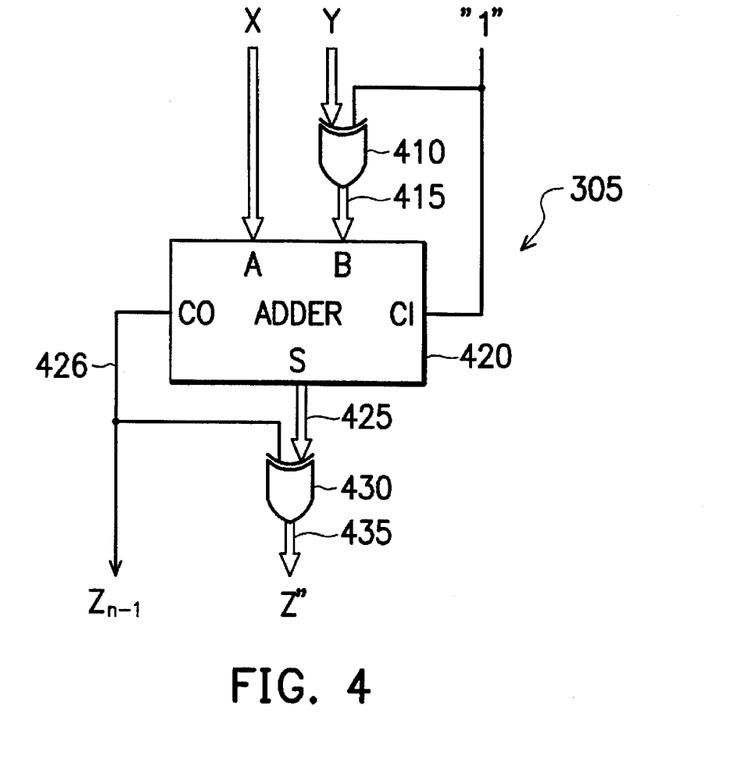
FIG. 4 is a schematic diagram of a DS computation member utilized in the computation logic of FIG. 3.

Referring next to FIG. 4, which is a schematic diagram of the DS computation member 305 utilized in the computation logic of FIG. 3, the DS computation member includes an adder member generally represented by an adder 420. The adder 420 has one of its two added value input ports A and B tied to the output of an exclusive-OR gate 410. The output 425 of the adder 420 is in turn connected to the input of a second exclusive-OR gate 430. The pixel data Y selected from a number of compared image blocks is first provided to one input of the two-input exclusive-OR gate 410. The other input of gate 410 is tied to the fixed logical value of 1. This gate 410 provides the 1's complement of the value Y as the output 415 thereof.

The adder 420 is then utilized to add this 1's complement of the compared image block pixel data Y, to the other value X, which is the pixel data of the corresponding original image block, along with the carry-in bit CI, which is tied to the fixed logical value of 1 to provide the 2's complement of the value Y. As a result, the summation value X-Y can be obtained at the output 425 of the adder 420, with the carry out 426 issued as the sign bit $z_{n-1}$.

Next, the value of X-Y, that is, the output 425 of the adder 420, and the sign bit 426 thereof, can be provided to the second exclusive-OR gate 430. In the arrangement, the value X-Y is provided to one of the two inputs of the exclusive-OR gate 430, while the sign bit 426, that is, $z_{n-1}$, is provided to the other input thereof. If the sign bit 426 is a logical 1, bits of the value 425 of X-Y are each exclusive-ORed to obtain the 1's complement thereof. If, on the other hand, the sign bit 426 has a logical value of 0, then the bits of the value 425 of X-Y remain uninverted. This produces an exclusive-ORed result at the output of the exclusive-OR gate 435.

Figure 5:
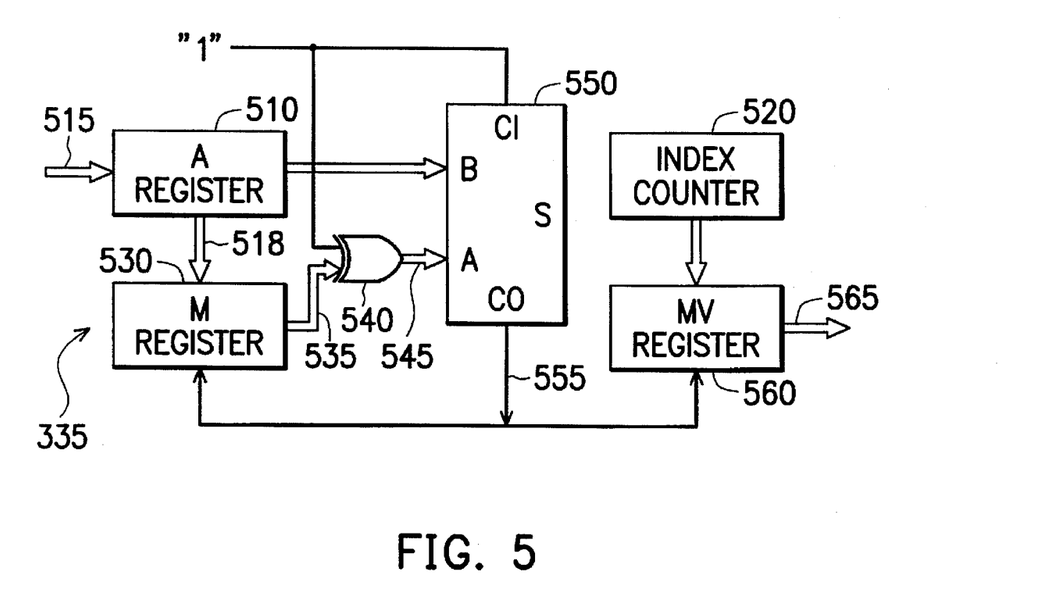
FIG. 5 is a schematic diagram of hardware logic for obtaining the minimum value for the logic of FIG. 3.

FIG. 5 is a schematic diagram of the hardware logic for obtaining the minimum value for the inventive logic of FIG. 3. It shows the last (fifth) stage, which is the minimum evaluation stage 330 of the pipelined architecture of the apparatus of the invention. As shown in the drawing, an A register 510, an index counter 520, an M register 530, a two-input exclusive-OR gate 540, a comparative adder 550, and an MV register 560 form the hardware configuration of the minimum value evaluator element 335 of FIG. 3, which implements the task of finding the minimum value.

The A register 510 receives and holds the absolute error value 515, obtained by the AS adder 325 in the fourth stage 320 of FIG. 3, that corresponds to the compared image block currently being analyzed. The index counter 520, on the other hand, holds a record of the current shift of the compared image block with respect to the original counterpart. The M register 530, coupled to the output of the A register 510, is capable of holding a copy of the registered absolute error value 518 as fetched by the A register, and issues its contents as the minimum absolute error 535.

As shown in the drawing, the exclusive-OR gate 540 has one of its two inputs tied to the fixed logical value of 1, and has its other input connected to the output of the M register 530 for receiving the minimum absolute error 535. As described above, this is an arrangement to obtain the 1's complement, 545, of the minimum absolute error 535 at the output of the exclusive-OR gate 540. The 1's complement, 545, of the minimum absolute error 535 held in the M register 530 is provided to one of the added value input ports (port A) of the comparative adder 550, whereas the other adder input port (port B) receives the output of the A register 510, which is the registered-stored version of the absolute error value 515. Note at this point that the carry-in input (CI) of the adder 550 is also tied to a constant logical value of 1. This means that the absolute error value 515 and the 1's complement, 545, of the minimum absolute error 535, are always added together in the comparative adder 550, with a constant effective carry-in bit providing the 2's complement of the minimum absolute error 535. This allows an adder addition operation to be performed in the comparative adder 550, resulting in generation of the carry-out output bit 555.

The combination of the exclusive-OR gate 540 and the comparative adder 550 is equivalent to a subtractor-comparator. The logic arrangement can be used to perform a logic operation that subtracts the value of the current minimum absolute error 535 from the current absolute error value 515 of the compared image block, since the current absolute error value 515 is added with the 2's complement of the current minimum absolute error 535. Thus, if the addition operation performed in the comparative adder 550 results in a positive carry-out bit at 555, this indicates that the current absolute error value 515 provided to this minimum evaluation stage is smaller than the current minimum absolute error 535 temporarily held in the M register 530. In this case, the carry-out bit 555 also triggers the M register 530 to accept and hold the current absolute error value 515 as an input from the A register 510, and the value newly registered in the A register 510 becomes the new and effective current minimum absolute error 535. However, if the carry-out bit 555 is a logical 0, the situation is the reverse of that described above. The M register 530 will thus keep its current content intact, and the current minimum absolute error 535 remains unchanged.

The carry-out bit 555 is also provided to the MV register 560, as shown in the drawing. The MV register 560 can be considered to be triggered for latching new data in the same way as that of the M register 530. In other words, if it was decided that the current absolute error value 515 provided to this minimum evaluation stage is smaller than the current minimum absolute error 535 temporarily held in the M register 530, then the MV register 560 would be required to register as its new content the value retained in the index counter 520. In this regard, the value retained in the index counter is a representation of the current motion vector for the compared image block with respect to the original counterpart. The output 565 of the MV register 560, which is also the desired output of the minimum evaluation stage 330 of the pipelined architecture of the apparatus of the invention depicted in FIG. 3, thus always reflects the current minimum motion vector MV.

Figure 6:
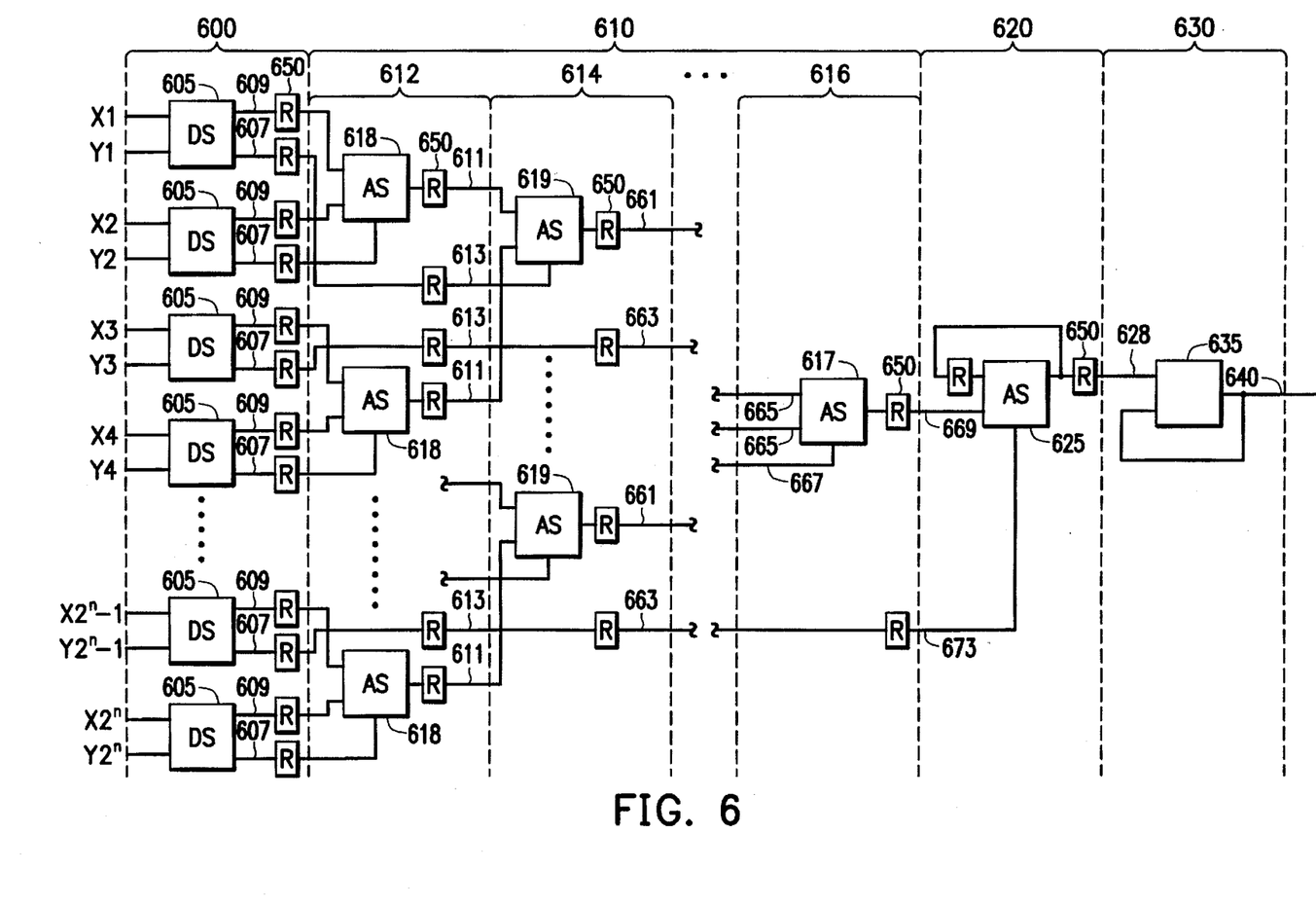
FIG. 6 is a schematic block diagram of $2^n$-channel hardware computation logic in accordance with another preferred embodiment of the invention.

FIG. 6 schematically shows the block diagram of the general $2^n$-channel hardware computation logic in accordance with a preferred embodiment of the invention. As mentioned above, such $2^n$-channel computation logic is suitable for use in practical systems having defined image pixels defined in more than 2×2 pixel matrices: Specifically, an application of this $2^n$-channel computation logic may be made for real-time digital video signal compression for video signal processing equipment. With its use of conventional logic elements as building blocks, and with its repetitive nature in structural configuration, such $2^n$-channel computation logic as depicted in FIG. 6 is particularly suitable for implementation into semiconductor integrated circuit devices. In operation, the apparatus of FIG. 6 is initiated by receiving original pixel data of an original image block and setting it as the basis for the comparative analysis to be performed. The pixel data of the original image block is then compared with the corresponding pixel data of a compared image block selected from a defined search area in a short time interval after the original data is received.

As is shown in the drawing, the $2^n$-channel hardware computation logic has a general pipeline configuration that is similar to that depicted in FIG. 3 for the $2^2$-channel apparatus. Essentially, the first stage in the pipeline is the DS computation stage 600 including a total of $2^n$ DS computation members 605. In the first stage, a total of $2^n$ DS computation members 605 (n, as was mentioned, being an integer) are provided, each arranged to receive a pair of pixel data Xi and Yi inputs from the original and the compared image blocks, respectively. As was in the case of the basic 2×2 logic described above, each of the DS computation members 605 subtracts one of its two inputs Xi and Yi from the other and derives the absolute value of the difference. The result of this operation in each of the DS computation members 605 is a sign bit 607 and an absolute value of the relative difference 609 between the two inputs Xi and Yi. Again, as was mentioned in the description of the basic 4-channel apparatus of FIG. 3, R buffering registers 650 are used to buffer the stage results as this is a pipelined operation. Registers are not only found in an initial stage 600, but are also used in a following section 610, and a further third section 620.

The second portion of the pipeline is a multi-stage summation section 610 that includes stages 612, 614, . . . , and 616. In the first stage 612 of the summation section 610, there are a total of $2^{n-1}$ AS adders 618, with each adder handling the inputs from two DS computation members 605 of the initial stage 600 of the pipeline. In a similar manner, there are arranged a total of $2^{n-2}$ AS adders 619 in the second stage 616 of the summation section 610, and finally a single AS adder 617 in the last stage 616 of the summation section 610. Each of the included AS adders 618, 619 and 617 is capable of performing an addition operation on two inputs. Therefore, the summation section 610 may be used to add together all the absolute values generated by the respective $2^n$ DS computation members 605, as is illustrated in the drawing. That is, one adder 618 adds the inputs received from two of the DS computation members 605, and the second AS adder 618 adds the inputs from another two, and so on, and the AS adder 617 subsequently adds the outputs of all the $2^{n-1}$ AS adders 618.

Then there is the accumulator stage 620. The accumulator stage 620 comprises an independent AS adder 625, capable of adding the output of the AS adder 617 in the last stage 616 of the summation section 610. On occasions wherein there are more than four pixels per divided image block that require processing for the analyzed video signal, the basic configuration of the 2×2 logic is thus expanded and subsequently processed. The image block to be analyzed can be divided into a number of sub-units, each comprising four pixels and subjected to processing as described above. With proper implementation of the procedure, larger image blocks can now be processed, requiring an extended time period to conclude. Essentially, the independent AS adder 625 of the accumulator stage 620 further adds the un-processed sign bit 673 of the initial stages 600 to the current absolute error 669 issued by the AS adder 617 of the last stage 616 in the summation section 610, and produces an output 628 for the next stage 630.

In this tree-architecture, the configuration starts with a total of $2^n$ DS computation members 605 in the very first stage of the pipeline, $2^{n-1}$ AS adders 618 in the second stage 612 of the pipeline (the first stage of the summation section 610), and $2^{n-2}$ AS adders 619 in the third stage 614 (the second stage of the summation section 610), and one AS adder 617 in the n-th stage, that is, the last stage of the summation section 610. All these n stages of adders can eventually take care of all the n sign bits, including bits 607 for the DS computation members 605 produced during the process of this pipeline operation for the processing of the video signal flowing therethrough.

The last stage of this $2^n$-channel hardware computation logic is the minimum evaluation stage 630. As is shown in FIG. 6, it includes a minimum value evaluator element 635 that is capable of comparing and identifying the minimum of two values provided thereto. One of the compared values is the output sent by the accumulator stage 620, which is also the summation of the absolute errors of the currently compared image block. The other compared value being compared is the recorded minimum value, obtained in the previous comparisons of the summation of the absolute errors for the compared and the original image blocks. After all of the possible image blocks are compared, the location of the compared image block having the minimum value may be obtained, together with its shift with respect to its corresponding original image block, which shift can be utilized as the motion vector 640, as generated by the last stage of this multiple-stage pipelined processing architecture.

Essentially, in this tree-architecture, the carry-out bits, or in other words, the sign bits, are not necessarily incorporated into the processing in the adder logic immediately on-site. Rather, they may perhaps be incorporated in the processing several stages later in the cascade, in the same manner as that described for the $2^2$-channel apparatus of FIG. 3.

Each of the DS computation members 605 utilized in the $2^n$-channel computation logic of FIG. 6, may employ the same hardware configuration as that illustrated in FIG. 4 described above, which plays exactly the same role as that for the basic $2^2$-channel apparatus of FIG. 3. Likewise, the minimum value evaluator element 635 of last stage of this $2^n$-channel hardware computation logic may employ the minimum evaluation hardware of FIG. 5 described above for the basic $2^2$-channel apparatus. It comprises the last stage, that is, the minimum evaluation stage 630 of the pipelined architecture of the apparatus of the invention.

Thus, the $2^n$-channel computation apparatus for video signal processing equipment can be summarized to feature at least the following advantages when compared to the prior art counterparts.

First of all, the complexity of the hardware configuration is significantly reduced, since only one adder is required for each of the involved DS computation members for the DS computation stage of the constructed pipeline. Taking into account the additional AS adders required in the summation and accumulation stages, it turns out that overall one-third of the adders used in the prior art devices can be eliminated. This reduces costs for the semiconductor integrated circuit implementation, not only because the device is simpler, but also because the yield rate factor of device fabrication can be improved significantly.

Secondly, since only one adder, instead of two required by the prior art, is involved in each DS computation member, the digital signal processing delay time is essentially cut in half in the computation stage, and the system operating clock rate can be significantly increased to improve overall system performance.

While the invention has been described by way of example and in terms of preferred embodiments, it is to be understood that the invention is not limited to the disclosed embodiments. It is intended to cover various modifications and similar arrangements. The scope of the invention, therefore, as defined by the appended claims, should be accorded the broadest interpretation so as to encompass all such modifications and similar structures.

What is claimed is:

1. An apparatus for implementing motion estimation block matching for video image processing, the apparatus receiving pixel data of an original image block and pixel data of a compared image block selected from a plurality of compared image blocks for comparison to the original image block, obtain a motion vector thereof, the apparatus having a multi-stage pipelined tree-architecture comprising:

a computation stage comprising $2^n$ computation members, wherein n is an integer greater than one and wherein each of said computation members includes:

a first exclusive-OR gate means, responsive to a corresponding one of the pixel data of the compared image block, for producing the 1's complement of the corresponding one of the pixel data, an adder means, having a summation output and a carry-out output, and coupled to an output of said exclusive-OR gate means, for adding the pixel data of the original image block and a logical 1 to the 1's complement of the pixel data of the compared image block, to produce a difference between the pixel data of the original image block and the pixel data of the compared image block, at the summation output, and a second exclusive-OR gate means, having two inputs coupled respectively to said summation output and said carry-out output of said adder means, said second exclusive-OR gate means producing a 1's complement of the difference at said summation output when a signal at said carry-out output is a logical 1; a summation section following said computation stage, including at least:

a first summation stage comprising $2^{n-1}$ adder means, wherein each of said $2^{n-1}$ adder means has two adder inputs, each of which is coupled to an output of one of said computation members in said computation stage, and a carry-in input coupled to one carry-out output of one of the adder means of said computation stage, for producing as an output thereof a sum of values at said two adder inputs and said carry-in input, and wherein said first summation stage further relays therethrough un-added carry-out outputs of said computation stage;

a second summation stage, including $2^{n-2}$ adder means, wherein each of said $2^{n-2}$ adder means has two adder inputs, each of which is coupled to an output of one of the $2^{n-1}$ adder means in said first summation stage, and a carry-in input coupled to one un-added carry-out output of said first summation stage, for producing as an output thereof a sum of values at the two adder inputs and said carry-in input, and wherein said second summation stage further relays therethrough un-added carry-out outputs of said first summation stage of said summation section; and an n-th summation stage including a single adder means, wherein said single adder means has two adder inputs, each of which is coupled to an output of the two adder means in the (n-1)-th summation stage, and a carry-in input coupled to the last carry-out output of the summation stages preceding thereto, for producing a sum of values at the two adder inputs, and wherein said n-th summation stage further relays therethrough a last un-added carry-out output of said (n-1)-th summation stage;

an accumulation stage coupled to said n-th summation stage of said summation section, including an adder means for adding the output of said single adder means of said n-th summation stage and said last un-added carry-out output to produce a sum thereof as an output; and a minimum value evaluation stage, coupled to said accumulation stage, including a minimum evaluator means, coupled to the output of said adder means of said accumulation stage, for evaluating the output of the accumulation stage at subsequent points in time and generating a minimum evaluated output of said accumulation stage as a motion vector for the implementation of motion estimation block matching for video image processing.

2. The apparatus of claim 1, including a semiconductor integrated circuit device, said semiconductor device including said multi-stage pipelined tree-architecture.

3. The apparatus of claim 1, wherein the pixel data of the compared image block has a location corresponding to the location of the pixel data of the original image block.

4. The apparatus of claim 1, wherein said adder means of said accumulator stage further adds the output of one adder means in an immediate preceding stage for producing an absolute error value for said compared image block with respect to said original image block.

5. The apparatus of claim 1, wherein said minimum evaluator means further comprises:

a first register means, having an input thereof coupled to the output of said adder means of said accumulation stage, for receiving and holding the output summation which is the absolute error value of a current compared image block;

an index counter means for holding a copy of a shift of the compared image block with respect to the original image block;

a second register means, having an input thereof coupled to an output of said first register means, for holding a copy of the absolute error value received by said first register means as a current minimum absolute error value;

an exclusive-OR gate means, having one of two inputs thereof fixed at a source of logical 1 and having the other of the two inputs coupled to the output of said second register means, for producing a 1's complement of the current minimum absolute error value held in said second register means;

an adder means, having one of two adder inputs thereof coupled to an output of said exclusive-OR gate means, the other of the two adder inputs coupled to the output of said first register means, and a carry-in input thereof fixed at a logical 1, said adder means producing a carry-out output as a result of an addition operation thereof, the carry-out output being coupled to said second register means for controlling a data registering operation thereof when the carry-out output is a logical 1; and a third register means, coupled to an output of said index counter means, for receiving the copy of the shift held therein when the carry-out output of said adder means is a logical 1, to serve as the motion vector for the implementation of motion estimation block matching for video image processing.

* * * * *